L. CYGON.
VEHICLE WHEEL.
APPLICATION FILED AUG. 9, 1916.

1,211,096.

Patented Jan. 2, 1917.

Witness
Arthur K. Moore
L. N. Gillis

Inventor
L. Cygon
By
Attorneys

UNITED STATES PATENT OFFICE.

LEON CYGON, OF MEADVILLE, MISSISSIPPI.

VEHICLE-WHEEL.

1,211,096. Specification of Letters Patent. Patented Jan. 2, 1917.

Application filed August 9, 1916. Serial No. 114,026.

*To all whom it may concern:*

Be it known that I, LEON CYGON, a citizen of the United States, residing at Meadville, in the county of Franklin, State of Mississippi, have invented certain new and useful Improvements in Vehicle-Wheels; and I do hereby declare the following to be a full, clear, and exact description of the invention, such as will enable others skilled in the art to which it appertains to make and use the same.

This invention relates to vehicle wheels and has special reference to a spring wheel for use on the steering or front axles of automobiles.

One important object of the invention is to improve and simplify the general construction of devices of this character.

A second important object of the invention is to provide an improved spring wheel wherein the resistance to vertical movement of the rim with respect to the axle will be greater than the resistance to horizontal movement of such rim, the effect being to take up the vertical shocks due to inequalities of the road more readily while at the same time effecting starting and stopping of the vehicle with greater resilience.

A third object of the invention is to provide an improved wheel of this character wherein the moving parts are carried in an improved manner on ball bearings.

With the above and other objects in view, as will be hereinafter apparent the invention consists in general of certain novel details of construction and combinations of parts hereinafter fully described, illustrated in the accompanying drawings and specifically claimed.

Figure 1:
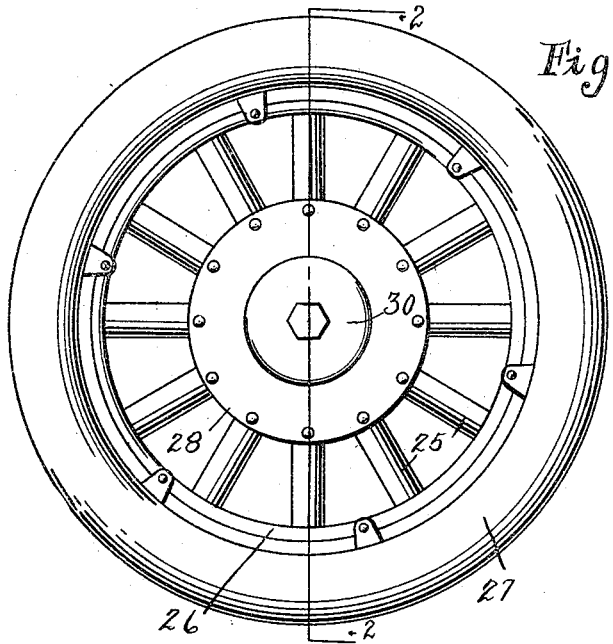
Figure 2:
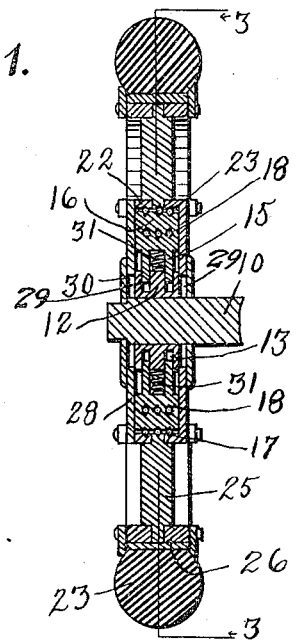
Figure 3:
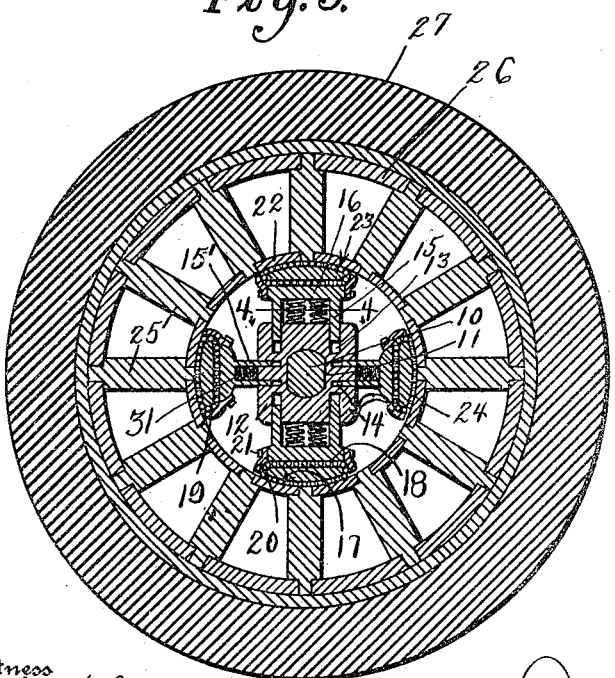
Figure 4:
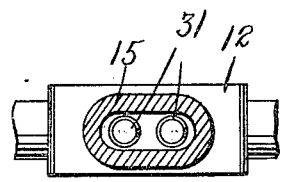

In the accompanying drawings, like characters of reference indicate like parts in the several views, and Figure 1 is a side view of the wheel. Fig. 2 is a section on the line 2—2 of Fig. 1. Fig. 3 is a section on the line 3—3 of Fig. 2. Fig. 4 is a section on the line 4—4 of Fig. 3.

In the embodiment of the invention herein disclosed there is shown a front axle 10 which is provided with flattened sides 11. On this front axle 10 is fitted a hub member 12 which has an opening to receive the axle, the opening having flattened portions corresponding with the flattened sides 11. Thus this hub member 12 is held against rotation on the axle 10. The hub 12 is preferably rectangular in cross section as clearly shown in Fig. 3 and in two of the sides of this hub member is a pair of recesses arcuate in form and connected by longitudinal channels so that the whole form a flattened annular recess as indicated at 13. The remaining sides are provided with annular recesses 14. In the recesses 13 and 14 are fitted plungers having flanges 15 and 15' respectively, 15 corresponding to the shape of the recess and provided each with a head 16. The faces of each of these heads 16 are provided with ball races 17 and through each head run ball return passages 18 which are connected to the ball races 17 by means of curved passages 19 formed in closure plates 20 secured at each end of the passages 18 by means of bolts 21. Surrounding the heads 16 is a hub ring 22 provided with ball races 23 coacting with the ball races 17 and carried in these ball races and the passages 18 are balls 24.

Projecting from the hub ring 22 are spokes 25 which carry on their outer ends the usual rim 26 supporting a solid tire 27 of rubber or other like material. Secured to the hub ring 22 are annular plates 28 having openings 29 in the center which are of sufficient size as to permit play of these plates on the axle 10. These openings 29 are covered by dust-caps 30 which fit closely on the axle 10 and closely against the plate 28 as clearly shown in Fig. 2. It will be obvious that any form of packing desired may be employed in connection with these plates but the same is not here shown as it forms no particular part of this invention.

Disposed in the spaces formed by each of the flanges 15 and between the heads 16 and the member 12 are spiral compression springs 31 and it is to be observed that the vertical movement of the wheel with respect to the axle 10 is resisted by a greater number of these spiral springs than is the longitudinal movement, this construction being clearly shown in Fig. 3. The reason for this is that the vertical shocks to which the wheel is subjected while running, are greater than the shocks or stresses brought about by starting and stopping or from other causes in a horizontal direction.

By means of the construction just described the wheel will run very lightly while yielding readily to any vertical or horizontal shocks and it is to be noted that the balls will fall around the races and return through the passages or openings 18 so that the hub ring will run very easily on the center of the wheel. There has thus been provided a simple and efficient device of the kind described and for the purpose specified.

It is obvious that many minor changes may be made in the form and construction of the invention without departing from the material principles thereof. It is not therefore desired to confine the invention to the exact form herein shown and described but it is wished to include all such as properly come within the scope claimed.

Having thus described the invention, what is claimed as new, is:—

In a wheel of the class described, a hub member adapted to be fixedly positioned on an axle, oppositely disposed vertically movable plungers carried by said hub member, other oppositely disposed horizontally movable plungers carried by said member, springs normally urging said plungers outwardly, heads on said plungers provided with ball races in their outer faces and having ball return passages communicating with the ends of the races, a hub ring surrounding said heads and having ball races formed internally of said ring to coact with the first-mentioned ball races, balls in said races and passages, spokes extending from the ring, and a rim carried by the outer ends of the spokes.

In testimony whereof, I affix my signature, in the presence of two witnesses.

LEON CYGON.

Witnesses:
RUFUS C. WALKER,
R. G. SAXON.

Copies of this patent may be obtained for five cents each, by addressing the "Commissioner of Patents, Washington, D. C."